United States Patent

Ashe et al.

Patent Number: 5,809,063
Date of Patent: Sep. 15, 1998

[54] COHERENT DETECTION ARCHITECTURE FOR REMOTE CALIBRATION OF COHERENT SYSTEMS USING DIRECT SEQUENCE SPREAD SPECTRUM TRANSMISSION OF REFERENCE AND CALIBRATION SIGNALS

[75] Inventors: Jeffrey Michael Ashe, Gloversville; Robert Leland Nevin; Seth David Silverstein, both of Schenectady, all of N.Y.; Guanghan Xu, Austin, Tex.

[73] Assignee: General Electric Company, Schenectady, N.Y.

[21] Appl. No.: 738,196

[22] Filed: Oct. 25, 1996

[51] Int. Cl.$^6$ ............... H04B 15/00; H04B 17/00; G01S 13/00; H01Q 3/00
[52] U.S. Cl. ............... 375/206; 375/200; 375/228; 342/174; 342/360
[58] Field of Search ............... 375/206, 200, 375/220, 228; 342/174, 360; 455/6.1, 6.2, 3.2

[56] References Cited

U.S. PATENT DOCUMENTS

| | | | |
|---|---|---|---|
| 4,621,365 | 11/1986 | Chui | 375/208 |
| 4,675,880 | 6/1987 | Davarian | 375/261 |
| 5,530,449 | 6/1996 | Wachs et al. | 342/174 |
| 5,559,519 | 9/1996 | Fenner | 342/174 |
| 5,677,696 | 10/1997 | Silverstein et al. | 342/360 |

OTHER PUBLICATIONS

R.L. Pickholtz et al., "Theory of Spread–Spectrum Communications–A Tutorial", IEEE Transactions on Communication, vol. COM–30, No. 5, May 1982.

R.L. Pickholtz et al., "Revisions to Theory of Spread–Spectrum Communications–A Tutorial", IEEE Transactions on Communication, vol. COM–32, No. 2, Feb. 1984.

D.V. Sarwate et al., "Crosscorrelation Properties of Pseudorandom and Related Sequences", Proceedings of the IEEE, vol. 68, No.1 5, May 1980.

W.K. Pratt et al., "Hadamard Transform Image Coding", Proceedings of the IEEE 57, No. 1 (Jan. 1969), pp. 58–68.

*Primary Examiner*—Chi H. Pham
*Assistant Examiner*—Khai Tran
*Attorney, Agent, or Firm*—Marvin Snyder; Douglas E. Stoner

[57] ABSTRACT

An architecture that provides for coherent detection of the relative amplitude and phase of a calibration signal used in the remote calibration of an active transmitting or receiving phased array system employs two coherent signals, one being a reference signal and the other being the calibration signal that contains the relative amplitude and phase information desired in the calibration process. Direct sequence spread spectrum techniques are used to transmit the two coherent signals. Continuous time binary antipodal waveform signals are generated and used to transmit the reference and calibration signals. Relevant amplitude and phase information needed for the calibration can be extracted while compensating for non-synchronized oscillators and the effects of Doppler shifts due to relative motion of the transmitting and receiving platforms. The detection architecture is effective for satellite-based phased array systems, including geostationary, medium and low earth orbit communication satellites, and space-based synthetic aperture radar reconnaissance satellites.

11 Claims, 2 Drawing Sheets

COHERENT DETECTION ARCHITECTURE FOR REMOTE CALIBRATION OF COHERENT SYSTEMS USING DIRECT SEQUENCE SPREAD SPECTRUM TRANSMISSION OF REFERENCE AND CALIBRATION SIGNALS

BACKGROUND OF THE INVENTION

This invention relates to phased arrays in communications systems and, more particularly, to an architecture for coherent detection of the relative amplitude and phase of a calibration signal used in the remote calibration of an active transmitting and/or receiving phased array system using direct sequence spread spectrum transmission of reference and calibration signals.

A need exists for transmitting/receiving architectures that can be used in remote calibration of a phased array system to coherently detect relative amplitude and phase information while compensating for phase shifts due to a combination of effects such as unsynchronized clocks on the remote and receiving site, and Doppler frequency shifts caused by relative motion of the transmitting and receiving platforms.

This invention employs spread spectrum techniques in transmitting calibration and reference signals to a receiver. Spread spectrum communications is advantageous in communication applications requiring high reliability in a noisy environment. The dominant noise often is man-made interference that is either intentional or accidental. In a specific application, the communications environment may include many potential reflectors giving rise to severe multi-path interference. Such multi-path interference typically insinuates deep nulls in the form of frequency selective fading. Spread spectrum communications is an excellent countermeasure to these difficulties.

Among the types of spread spectrum systems are direct sequence spread spectrum systems, frequency hopping systems, time hopping systems, pulsed frequency modulated (or chirp) systems, and various hybrids. Of these, the direct sequence spread spectrum (DSSS) systems and frequency hopping systems are perhaps the more widely implemented. The following discussion focuses on binary DSSS systems.

In binary DSSS communication, a wide-band carrier signal is modulated by a narrow-band message signal. The wide-band carrier is typically generated by bi-phase modulating a single frequency carrier using a binary pseudo-random noise (P/N) code sequence. The P/N code is often generated using one or more high speed shift registers, each having modulo-two feedback according to a primitive polynomial. The generated high-speed P/N code is supplied to a balanced modulator (multiplier) whose other input signal is the narrow-band carrier. The balanced modulator produces a wide-band output signal, often referred to as a "wide-band carrier". To communicate data, the wide-band carrier is bi-phase modulated by a binary message data stream. The message data rate is usually much lower than the P/N-code symbol or "chip" rate, and the data and code-chip edges are usually synchronized. The ability of the DSSS technique to suppress interference is directly proportional to the ratio of the code-chip rate to the data rate. In many applications, there are thousands of code chips per message bit.

A DSSS signal can be received by first shifting the signal frequency down to baseband by multiplying the signal with a locally generated replica of the original narrow-band carrier (e.g., a properly tuned local oscillator). If the frequency (and phase) of the carrier replica is the same as that of the received original narrow-band carrier, then the multiplier output signal will be a bipolar "wide-band data" stream that is the product of the bipolar P/N code and message-data sequences. The P/N code is then removed by multiplying the wide-band data stream with a locally generated replica of the P/N code that is time aligned with the received P/N code. This is the data de-spreading process and yields the original message data stream at the multiplier output.

In the data de-spreading process, the wide-band data power spectrum is refocused into the original narrower data bandwidth, raising the data power level well above the background noise in that bandwidth. The amount that the power level is raised is the so-called processing gain and is directly proportional to the ratio of the code rate to the data rate. Furthermore, any received narrow-band interference is spread by the code-replica modulation, and this greatly reduces the interference power level in the data band.

An often difficult task associated with DSSS signal reception is that of generating the carrier replica with proper carrier frequency and phase and generating the P/N code replica at the proper rate and with proper time alignment (offset). In many DSSS communication systems, the necessary carrier frequency and phase, and P/N code offset are not known a priori at the receiver and these parameters must be determined by trying different values until a large signal is observed at the data-filter output. This is known as the search or acquisition process, and a DSSS signal is said to be acquired when the proper frequency, phase, and code offset have been determined.

In many DSSS applications, the DSSS signal levels are well below the background noise and/or interference levels and are not detectable until properly de-spread and low-pass filtered. When the received signal-to-noise ratio (SNR) is very low, the filter must be very narrow to achieve the processing gain needed for signal detection and acquisition. Because a narrow filter requires a long integration period, the result of multiplying many received P/N code samples by the corresponding replica P/N code samples must be accumulated before the detection decision can be made. This multiplication and accumulation is a cross correlation between the received and replica P/N code sequences, and the sequences may have to be long for low SNR signals.

Another advantage of using DSSS is that multiple users can simultaneously share the same wide-band channel using the code-division multiple access (CDMA) technique. The present invention permits two signals at the same frequency to be transmitted so that each will encounter the same shifts and atmospheric conditions as the other, and these signals are separated at the receiver. With this technique, each transmitter utilizes a different P/N code so that the cross correlation between different codes is substantially zero. The receiver selects and detects a particular transmitted signal by choosing the appropriate P/N code and performing the acquisition search. In some instances, it is unknown which transmitter may be transmitting and the acquisition search must examine different P/N codes from a known list. When many different codes, code offsets and carrier frequencies must be examined and the SNR is low, the acquisition task can be both time and energy consuming.

A description of direct sequence and other types of spread spectrum communications systems may be found, for example, in *Spread Spectrum Systems,* 3rd Ed., by Robert C. Dixon, John Wiley & Sons (1994), and *Spread Spectrum Communications,* Vol. II, by M. K. Simon et al., Computer Science Press (1985). A description of CDMA techniques may be found, for example, in *CDMA Principles of Spread*

*Spectrum Communication,* by Andrew J. Viterbi, Addison-Wesley (1995).

SUMMARY OF THE INVENTION

The architecture according to the present invention provides for coherent detection of the relative amplitude and phase of a calibration signal used in remote calibration of an active transmitting or receiving phased array system. Two coherent signals are used, one being a reference signal and the other being the calibration signal that contains the relative amplitude and phase information desired in the calibration process. Continuous time binary antipodal waveform signals are generated and used to transmit the reference and calibration signals. The architecture includes appropriate circuitry to extract the relevant amplitude and phase information needed for the calibration while compensating for non-synchronized oscillators and the effects of Doppler shifts due to the relative motion of the transmitting and receiving platforms. This detection architecture is effective for satellite-based phased array systems which can include, for example, geostationary, medium and low earth orbit communication satellites, and space-based synthetic aperture radar reconnaissance satellites.

The coherent detection architecture of the invention can be effective with any method for determining the relative amplitudes and phases of the signals emitted for the elements of the phased array. The architecture is particularly applicable to coherent encoding calibration procedures that enhance the effective SNR by using coherent transmission of orthogonal transform encoded signals from N elements of the phased array. In an example of calibration architecture, coherent elemental signals are encoded using controlled switching of the delay phase control circuits themselves to effectively generate a perfect orthogonal transform encoding of the signal vectors, even though the control circuits may be imperfect; no additional encoding hardware is required. The switching is dictated by matrix elements of an N×N invertible binary matrix, with the most preferred embodiment being an orthogonal bipolar matrix, i.e., a Hadamard matrix. The coherent signals are decoded with the inverse of the same binary matrix used in the control circuit encoding.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1:
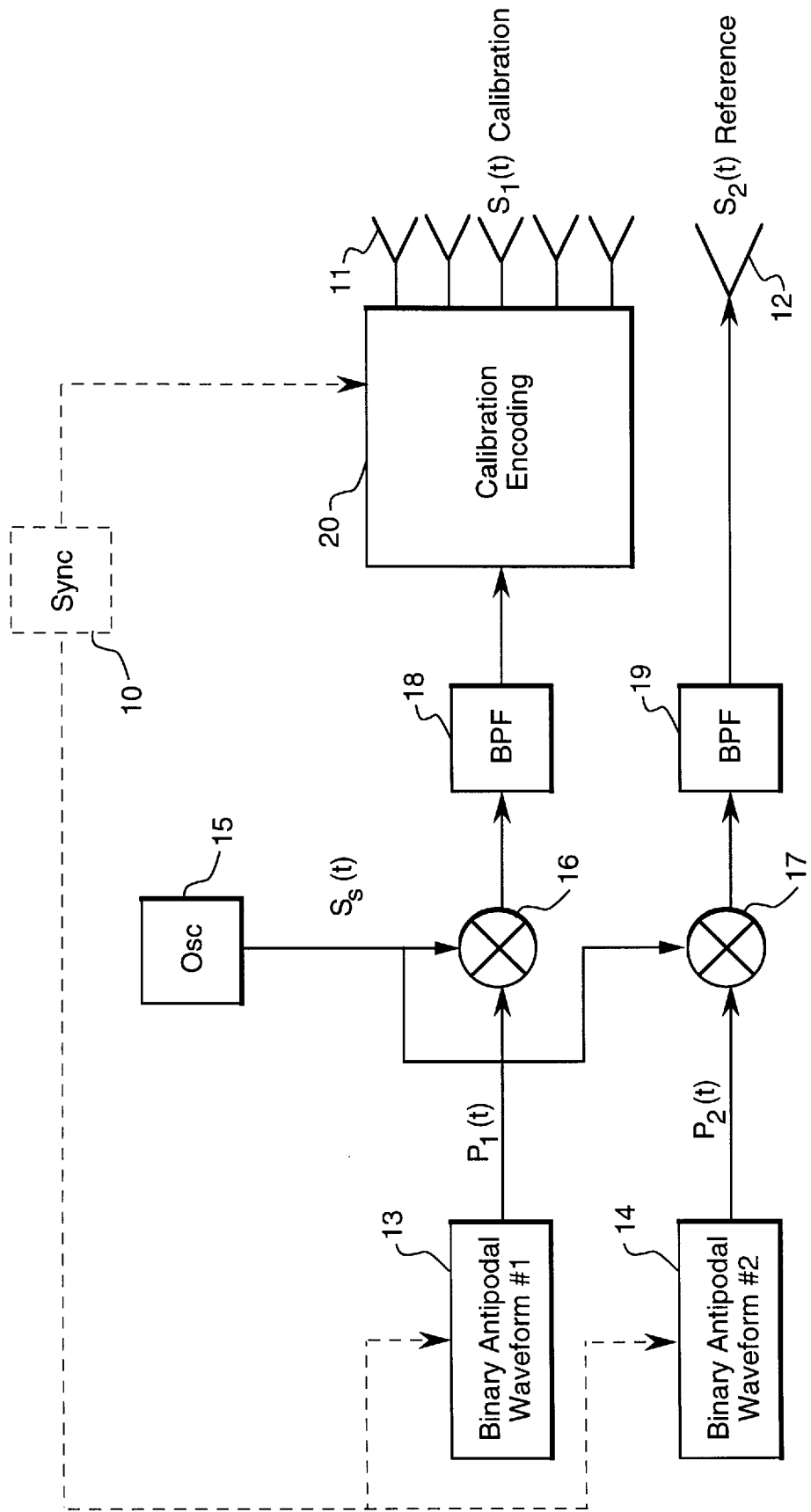
FIG. 1 is a block diagram of the transmission circuit according to a first embodiment of the invention.

FIG. 1 shows, in block diagram form, the generation/transmission system in which a calibration signal $S_1(t)$ is emitted from all the elements of a phased array 11. A reference signal $S_2(t)$ is emitted from a horn antenna 12, although it may, alternatively, be emitted from a subset or the complete set of array elements 11. The reference signal must be constant throughout the calibration process; therefore, if emitted from a subset or the complete set of array elements 11, the reference signal must bypass the phase shifters that are used to encode the elements.

A pair of waveform generators 13 and 14, controlled by a synchronous controller 10, are used to generate continuous time binary antipodal waveform signals from the vector coefficients of two N-element binary antipodal vectors having coefficients given by $$c_i(n)=\pm 1; \; i=1,2; \; n=1, 2, \ldots, N, \tag{1}$$

that satisfy the orthogonality condition:

$$\sum_{n=1}^{N} c_i(n)c_k(n) = N\delta(i-k); \; i=1,2; \; n=1,2. \tag{2}$$

The vector coefficients are expressed as:

$$P_i(t) = \sum_{n=1}^{N} c_i(n) \left[ U\left(t - \frac{(n-1)T}{N}\right) - U\left(t - \frac{nT}{N}\right) \right]; \; i=1,2, \tag{3}$$

where T is the total length of the waveform and U(t) is the unit step function. These signals modulate the carriers in the same manner as binary phase shift keying (BPSK). The transmission circuit of FIG. 1 repeats these waveforms on scheduled intervals.

The continuous binary antipodal waveforms are heterodyned with an up conversion signal $S_s(t)$ from a local oscillator 15 in mixers 16 and 17. The up conversion signal may be expressed as:

$$S_s(t)=\cos(2\pi f_s t+\phi_s), \tag{4}$$

where $\phi_s$ corresponds to the unknown phase of the satellite oscillator at time t=0. The output signals of mixers 16 and 17 are filtered in bandpass filters 18 and 19, respectively, each filter having a center frequency of $f_s$ and 3 dB two-sided bandwidth of 2/T so as to produce a modulated calibration carrier signal $$S_1(t)=A_1 P_1(t) \cos(2\pi f_s t+\phi_s+\theta_1), \tag{5}$$

and a modulated reference carrier signal, $$S_2(t)=A_2 P_2(t) \cos(2\pi f_s t+\phi_s+\theta_2), \tag{6}$$

where $A_i$ and $\theta_i$ correspond to the amplitude and phase information of the ith signal path. The desired relative amplitude and phase information are encoded in calibration encoding circuitry 20, also controlled by synchronous controller 10, and are given by $$A_{rel} = \frac{A_1}{A_2}, \; \theta_{rel} = \theta_1 - \theta_2. \tag{7}$$

The transmitting synchronization function provides changes in calibration coefficients at the boundaries between repetitions of the continuous time binary antipodal waveform. The calibration encoding applies an amplitude and phase (contained in $A_1$ and $\theta_1$) to the signal, and changes this amplitude and phase only at the interval between repetitions of the codes. There may be one calibration encoding for each repetition of the code (if the code is long enough) or there may be many repetitions of the code for each calibration encoding. The clocks for the code generation and the calibration encoding will be locked by some multiple.

The amplitude and phase shift of the signals propagating from the satellite to the ground station are modeled by $A_{tr}(f)$ and $\theta_{tr}(f)$, where f is the frequency of the modulated carrier. The delay from the satellite to the ground station during a single code transmission is modeled by a first order function of time $$\tau = \frac{1}{c}(R_0 + v_r t), \tag{8}$$

where $R_0$ is the range and $v_r$ is the radial component of velocity from the satellite to the ground station, and c is the speed of light.

Figure 2:
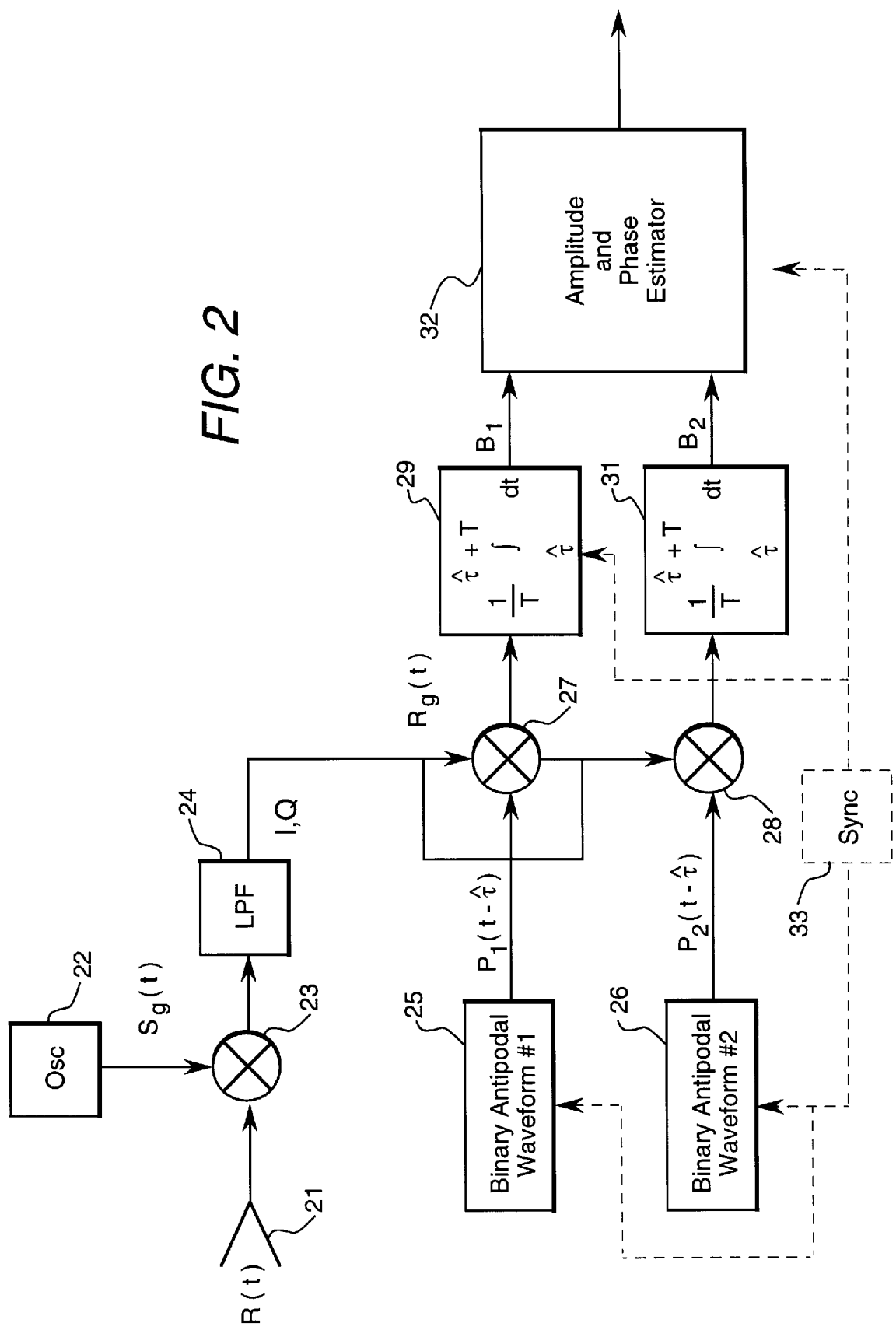
FIG. 2 is a block diagram of an embodiment of the analog receiver/phase decoder subsystem.

At the analog receiver/phase decoder subsystem shown in FIG. 2, which is situated at the ground station, the received signal is given by, $$R(t) = A_{tr}(f_s D) A_1 P_1(t-\tau) \cos\left(2\pi f_s D t - 2\pi f_s \frac{R_0}{c} + \theta_{tr}(f_s D) + \phi_s + \theta_1\right) + A_{tr}(f_s D) A_2 P_2(t-\tau) \cos\left(2\pi f_s D - 2\pi f_s \frac{R_0}{c} + \theta_{tr}(f_s D) + \phi_s + \theta_2\right), \tag{9}$$

where $$D = 1 + \frac{v_r}{c}.$$

The receiver/coherent detection circuit shown in FIG. 2 receives the received signal at a horn antenna 21 and hetrodynes the signal with a down conversion signal from a local oscillator 22 in a mixer 23. The down conversion signal may be expressed as $$S_g(t) = \cos(2\pi f_g t + \phi_g), \tag{11}$$

where $\phi_g$ corresponds to an unknown phase of oscillator 22 at time t=0 and $f_g$ is in the vicinity of $f_s D$. The down converted signals are synchronous in-phase and quadrature (I,Q) signals.

The I and Q signals are filtered in a low pass filter 24 of two-sided 3 dB bandwidth of 2/T to produce the final down converted signal, $$R_g(t) = A_{tr}(f_s D) A_1 P_1(t-\tau) e^{j\left(2\pi(f_s D - f_g)t - 2\pi f_s \frac{R_0}{c} + \theta_{tr}(f_s D) + \phi_s - \phi_g + \theta_1\right)} + A_{tr}(f_s D) A_2 P_2(t-\tau) e^{j\left(2\pi(f_s D - f_g)t - 2\pi f_s \frac{R_0}{c} + \theta_{tr}(f_s D) + \theta_s + \phi_s + \theta_2\right)} \tag{12}$$

The down converted signal is demodulated in demodulators 27 and 28 with delayed replicas of the continuous time binary antipodal waveform signals $P_1(t-\hat{\gamma})$ and $P_2(t-\hat{\gamma})$ from waveform generators 25 and 26, respectively, and integrated over the duration of the waveform in complex integrators 29 and 31, producing signals of the form $$B_i = aA_1 e^{j\theta_1} \frac{1}{T} \int_\tau^{T+\tau} P_i(t-\tau) P_1(t-\tau) e^{j2\pi(f_s D - f_g)t} dt + aA_2 e^{j\theta_2} \frac{1}{T} \int_\tau^{T+\tau} P_i(t-\tau) P_2(t-\tau) e^{2\pi(f_s D - f_g)t} dt, i = 1 \tag{13}$$

where the complex constant a is given by $$a = A_{tr}(f_s D) e^{j\left(-2\pi f_s \frac{R_0}{c} + \theta_{tr}(f_s D) + \phi_s - \phi_g\right)}. \tag{14}$$

Binary antipodal waveform generators 25 and 26 and complex integrators 29 and 31 are synchronously controlled by a synchronous controller 33. Using an error in the estimate of delay of $$\Delta\tau = \hat{\tau} - \tau, \tag{15}$$

a frequency offset of $$\Delta\omega = 2\pi(f_s D - f_g), \tag{16}$$

and a change of variables of integration, equation (13) can be rewritten as $$B_i = ae^{j\Delta\omega t}\{A_1 e^{j\theta_1} G_{i1} + A_2 e^{j\theta_2} G_{i2}\}, \tag{17}$$

where the two dimensional autocorrelation/cross-correlation function is defined by $$G_{ik}(\Delta\tau, \Delta\omega) = \frac{1}{T} \int_0^T P_i(\zeta) P_k(\zeta - \Delta\tau) e^{j\Delta\omega \zeta} d\zeta$$
$$i = 1,2; k = 1,2. \tag{18}$$

Estimates of relative amplitude and phase are determined by amplitude and phase estimator 32 from the ratio of the final estimates, $$\beta = \frac{B_1}{B_2} = \frac{A_1}{A_2} e^{j(\theta_1 - \theta_2)} \left\{ \frac{\left(\frac{G_{11}(\Delta\tau, \Delta\omega)}{G_{22}(\Delta\tau, \Delta\omega)}\right) \left(1 + \frac{A_2}{A_1} e^{j(\theta_2 - \theta_1)} \frac{G_{12}(\Delta\tau, \Delta\omega)}{G_{11}(\Delta\tau, \Delta\omega)}\right)}{1 + \frac{A_1}{A_2} \frac{e^{j(\theta_1 - \theta_2)} G_{21}(\Delta\tau, \Delta\omega)}{G_{22}(\Delta\tau, \Delta\omega)}} \right\}, \tag{19}$$

with $$\hat{A}_{ref} = |\beta|, \hat{\theta}_{ref} = \Delta(\beta). \tag{20}$$

Cancellation of the phase change due to unknown range, unknown atmospheric attenuation and phase change, and unknown initial oscillator phase (collectively called the a term) is a key feature of this architecture. Errors in the estimate of delay and frequency offset (in addition to receiver noise) are the contributors to the errors in the relative amplitude and phase estimates.

For zero delay error and zero frequency offset, $$G_{ik}(0,0) = \delta_{ik}, \tag{21}$$

resulting in accurate estimates using $$\beta = \frac{A_1}{A_2} e^{j(\theta_1 - \theta_2)}. \tag{22}$$

The receiving synchronization function provides estimates of the delay in signal travel from the satellite to the ground station by use of the techniques described, and provides this estimate to the waveform generators and integrators. Since waveform generators 25 and 26 generate the codes $P_i(t - \tau_{estimate})$, the integrators are locked to integrate over each repetition of the code.

Many techniques exist for determining the delay in signal travel from the satellite to the ground station. In particular, the delay can be estimated by choosing the largest output signal of a bank of correlators matched to the reference code each with a delay spacing less than the chip interval. Alternatively, the delay estimate can be determined by choosing the peak of the output signal of a matched filter for the reference code. Both methods require selection of codes with low sidelobe autocorrelation and low peak cross correlation functions. Choices of two codes with these autocorrelation/cross correlation properties are well known. The effects of receiver noise on the accuracy of the delay estimate can be reduced by multiple repetitions of the reference code before calibration begins.

While only certain preferred features of the invention have been illustrated and described, many modifications and changes will occur to those skilled in the art. It is, therefore, to be understood that the appended claims are intended to cover all such modifications and changes as fall within the true spirit of the invention.

Having thus described our invention, what we claim as new and desire to secure by Letters Patent is as follows:

1. A transmission/receiving architecture for remote calibration of coherent systems using direct sequence spread spectrum transmission of reference and calibration signals comprising:

first and second binary antipodal waveform generators for synchronously generating first and second orthogonal signals $P_1(t)$ and $P_2(t)$, respectively;

up converting means for generating first and second up converted signals;

first transmitting means for applying amplitude and phase values to said first up converted signal and transmitting a calibration signal $S_1(t)$;

second transmitting means for receiving the second up converted signal and transmitting a reference signal $S_2(t)$;

a receiving antenna for receiving coherent calibration and reference signals from said first and second transmitting means;

down converting means for generating the in-phase and quadrature components of the received coherent calibration and reference signals;

third and fourth binary antipodal waveform generators for generating orthogonal delayed replica signals $P_1(t-\hat{\tau})$ and $P_2(t-\hat{\tau})$, respectively;

processing means for generating estimates of the amplitudes and phases of said reference and calibration signals in the form of first and second values $B_1$ and $B_2$, respectively; and an estimator for receiving said first and second values $B_1$ and $B_2$ and producing amplitude and phase estimates of the received calibration signal for calibration decoding.

2. The transmission/receiving architecture for remote calibration of coherent systems of claim 1 wherein said first transmitting means comprises:

calibration encoding means for receiving the first up converted signal and generating a plurality of phased signals in synchronism with said first and second binary antipodal waveform generators; and a phased array antenna for receiving output signals from said calibration encoding means and transmitting a signal having as the resultant pattern said calibration signal $S_1(t)$.

3. The transmission/receiving architecture for remote calibration of coherent systems of claim 2 wherein at least a portion of said phased array antenna comprises said second transmitting means for said reference signal.

4. The transmission/receiving architecture for remote calibration of coherent systems of claim 2 wherein said second transmitting means comprises a separate antenna.

5. The transmission/receiving architecture for remote calibration of coherent systems of claim 1 wherein both the calibration signals $S_1(t)$ and reference signals $S_2(t)$ are of the same frequency and said estimator is adapted to detect relative amplitude and phase while compensating for non-synchronized oscillators and Doppler shifts by taking a ratio of said first and second values $B_1$ and $B_2$.

6. The transmission/receiving architecture for remote calibration of coherent systems of claim 1 wherein said up converting means comprises first oscillator means for generating an up conversion local oscillator signal $S_s(t)$ and mixer means for receiving said first and second signals $P_1(t)$ and $P_2(t)$ and said local oscillator signal $S_s(t)$ and generating said first and second up converted signals, respectively, and wherein said down converting means comprises second local oscillator means for generating a down conversion signal $S_g(t)$ having a defined frequency and phase, and a synchronous demodulator for receiving the signal from the second local oscillator means for down-converting the received coherent calibration and reference signals.

7. The transmission/receiving architecture for remote calibration of coherent systems of claim 1 wherein said processing means for generating estimates of the amplitudes and phases of said reference and calibration signals comprises:

integrator means for integrating said first and second in-phase and quadrature calibration and reference signals, respectively, and generating said first and second values $B_1$ and $B_2$, respectively.

8. A coherent detection architecture for remote calibration of coherent systems using direct sequence spread spectrum transmission of reference and calibration signals comprising:

a generation/transmission subsystem comprising:

a first binary antipodal waveform generator for generating a baseband signal $P_1(t)$;

a second binary antipodal waveform generator synchronized to the first binary antipodal generator for generating a baseband signal $P_2(t)$ orthogonal to said baseband signal $P_1(t)$;

up converting means for generating first and second up converted signals;

a first transmitting antenna for accepting a signal from said first mixer and emitting a signal $S_1(t)$ as a calibration signal;

means for applying amplitude and phase values to the calibration signal; and a second transmitting antenna for accepting a signal from said second mixer and emitting a signal $S_2(t)$ as a reference signal; and a reception/detection subsystem comprising:

an antenna for receiving the transmitted calibration and reference signals $S_1(t)$ and $S_2(t)$;

down converting means for generating the in-phase and quadrature components of the received coherent calibration and reference signals;

a first binary antipodal waveform generator for generating a baseband delayed replica signal $P_1(t-\hat{\tau})$;

a second binary antipodal waveform generator synchronized to the first binary antipodal waveform generator for generating a baseband delayed replica signal $P_2(t-\hat{\tau})$;

a second demodulator for heterodyning the baseband reference and calibration signals from the first synchronous demodulator and low pass filter to produce in-phase and quadrature baseband reference output signals;

a third demodulator for heterodyning the baseband reference and calibration signals from the first synchronous demodulator and low pass filter to produce in-phase and quadrature baseband calibration output signals;

a first complex integrator for integrating the in-phase and quadrature baseband reference output signals over each of multiple repetitions of the delayed replica signals and producing a complex value $B_1$;

a second complex integrator for integrating the in-phase and quadrature baseband calibration output signals over each of multiple repetitions of the delayed replica signals and producing a complex value $B_2$; and an amplitude and phase estimator operating on the complex values $B_1$ and $B_2$ for producing relative amplitude and phase estimates of the received calibration signal for calibration decoding.

9. The coherent detection architecture for remote calibration of coherent systems of claim 8 including: calibration encoding means for receiving the first up converted signal from said first mixer and bandpass filter and generating a plurality of phased signals synchronous with said first and second binary antipodal waveform generators, wherein said first transmitting antenna comprises a phased array antenna for receiving output signals from said calibration encoding means and transmitting said calibration signal $S_1(t)$.

10. The coherent detection architecture for remote calibration of coherent systems of claim 8 wherein both the calibration signals $S_1(t)$ and reference signals $S_2(t)$ are of the same frequency and said estimator is adapted to detect relative amplitude and phase while compensating for non-synchronized oscillators and Doppler shifts by taking a ratio of said complex values $B_1$ and $B_2$.

11. The coherent detection architecture for remote calibration of coherent systems of claim 8 wherein said up converting means comprises a first local oscillator for generating an up conversion signal with defined frequency and phase, a first mixer and bandpass filter for heterodyning the up conversion signal with the $P_1(t)$ baseband signal, and a second mixer and bandpass filter for heterodyning the up conversion signal with the $P_2(t)$ baseband signal; and wherein said down converting means comprises a second local oscillator for generating a down conversion signal having a defined frequency and phase, and a first synchronous demodulator and low pass filter for heterodyning the down conversion signal with the received signals to produce in-phase and quadrature baseband reference and calibration signals.

* * * * *